United States Patent
Kitakado

(10) Patent No.: US 8,024,002 B2
(45) Date of Patent: Sep. 20, 2011

(54) ADAPTIVE ARRAY WIRELESS COMMUNICATION APPARATUS, RECEPTION LEVEL DISPLAY METHOD, RECEPTION LEVEL ADJUSTING METHOD, RECEPTION LEVEL DISPLAY PROGRAM AND RECEPTION LEVEL ADJUSTING PROGRAM

(75) Inventor: Jun Kitakado, Osaka (JP)

(73) Assignee: Kyocera Corporation, Kyoto (JP)

( * ) Notice: Subject to any disclaimer, the term of this patent is extended or adjusted under 35 U.S.C. 154(b) by 681 days.

(21) Appl. No.: 11/937,116

(22) Filed: Nov. 8, 2007

(65) Prior Publication Data
US 2008/0085739 A1 Apr. 10, 2008

Related U.S. Application Data

(62) Division of application No. 10/528,097, filed as application No. PCT/JP03/11179 on Sep. 1, 2003, now Pat. No. 7,583,983.

(30) Foreign Application Priority Data

Sep. 20, 2002 (JP) .................................. 2002-274409

(51) Int. Cl.
*H04M 1/00* (2006.01)
(52) U.S. Cl. .................. 455/562.1; 455/575.7; 455/566; 455/220
(58) Field of Classification Search .................. 455/504, 455/67.13, 67.16, 67.7, 562.1, 566, 575.7, 455/101, 115.3, 115.4, 135, 134, 136, 138, 455/140, 220, 69, 522, 550.1, 226, 63.4; 345/156; 370/312, 315
See application file for complete search history.

(56) References Cited

U.S. PATENT DOCUMENTS

| | | | |
|---|---|---|---|
| 5,203,024 A * | 4/1993 | Yamao | 455/133 |
| 5,239,698 A * | 8/1993 | Dejmek et al. | 455/136 |
| 5,442,356 A | 8/1995 | Hiltz et al. | |
| 5,486,843 A | 1/1996 | Otting et al. | |
| 5,585,805 A * | 12/1996 | Takenaka et al. | 342/461 |
| 5,719,907 A * | 2/1998 | Kaku et al. | 375/371 |
| 5,797,083 A | 8/1998 | Anderson | |
| 5,918,164 A * | 6/1999 | Takahashi et al. | 455/134 |
| 5,966,186 A * | 10/1999 | Shigihara et al. | 348/570 |

(Continued)

FOREIGN PATENT DOCUMENTS
JP 04-068622 3/1992
(Continued)

OTHER PUBLICATIONS

K. Nobuyoshi; "Adaptive Signal Processing by Array Antenna," Kagaku Gijutsu Shuppan, Chapter 3: MMSE Adaptive Array, Nov. 25, 1998, pp. 35-49.

(Continued)

*Primary Examiner* — Tan Trinh
(74) *Attorney, Agent, or Firm* — Foley & Lardner LLP

(57) ABSTRACT

In an adaptive array terminal, at least one of two antennas (ANT#1, ANT#2) is a movable antenna. A display unit (6) of the terminal displays reception levels of, or level difference between, the two antennas. Thus, it becomes possible for a user to adjust an angle of the antenna such that reception levels of the two antennas come closer to the same level. Alternatively, a control unit (8) of the terminal automatically adjusts the antenna angle so that reception level difference between the two antennas becomes not higher than a prescribed value.

6 Claims, 5 Drawing Sheets

U.S. PATENT DOCUMENTS

| | | | |
|---|---|---|---|
| 6,035,183 A * | 3/2000 | Todd et al. | 455/226.2 |
| 6,151,515 A | 11/2000 | Deguchi | |
| 6,393,307 B1 | 5/2002 | Kim | |
| 6,704,557 B1 | 3/2004 | Krishnamurthy et al. | |
| 6,771,984 B1 * | 8/2004 | Hiramatsu et al. | 455/561 |
| 6,836,244 B2 | 12/2004 | Kitakado | |
| 6,907,276 B2 | 6/2005 | Toba | |
| 7,085,909 B2 * | 8/2006 | Ananthanarayanan et al. | 711/202 |
| 7,133,446 B1 * | 11/2006 | Fulton | 375/224 |
| 2001/0043156 A1 | 11/2001 | Matsui et al. | |
| 2002/0072343 A1 * | 6/2002 | Miyatani | 455/272 |
| 2002/0128007 A1 * | 9/2002 | Miyatani | 455/423 |
| 2004/0014443 A1 * | 1/2004 | Nakao et al. | 455/130 |
| 2004/0152419 A1 * | 8/2004 | Lee | 455/67.7 |
| 2004/0165685 A1 * | 8/2004 | Kitakado | 375/343 |
| 2004/0235511 A1 * | 11/2004 | Nakao | 455/522 |
| 2005/0124289 A1 * | 6/2005 | Coffin, III | 455/3.02 |
| 2006/0194542 A1 * | 8/2006 | Doi et al. | 455/63.4 |
| 2006/0234653 A1 | 10/2006 | Yamamoto | |

FOREIGN PATENT DOCUMENTS

| | | |
|---|---|---|
| JP | 08-097759 | 4/1996 |
| JP | 08-321799 | 12/1996 |
| JP | 9-064640 | 3/1997 |
| JP | 09-205390 | 8/1997 |
| JP | 09-321677 | 12/1997 |
| JP | 11-234197 | 8/1999 |
| JP | 2001-183437 | 7/2001 |
| JP | 2001-186069 | 7/2001 |
| JP | 2001-320310 | 11/2001 |
| JP | 2002-016534 | 1/2002 |
| JP | 2002-135198 | 5/2002 |
| JP | 2002-261668 | 9/2002 |

OTHER PUBLICATIONS

European Patent Office partial European search report on application No. 04003495.1 dated Nov. 24, 2010; 5 pages.

Korean office action on applicaton No. 10-2004-0010594 dated Sep. 30, 2010; 3 pages (with partial English-language translation).

* cited by examiner

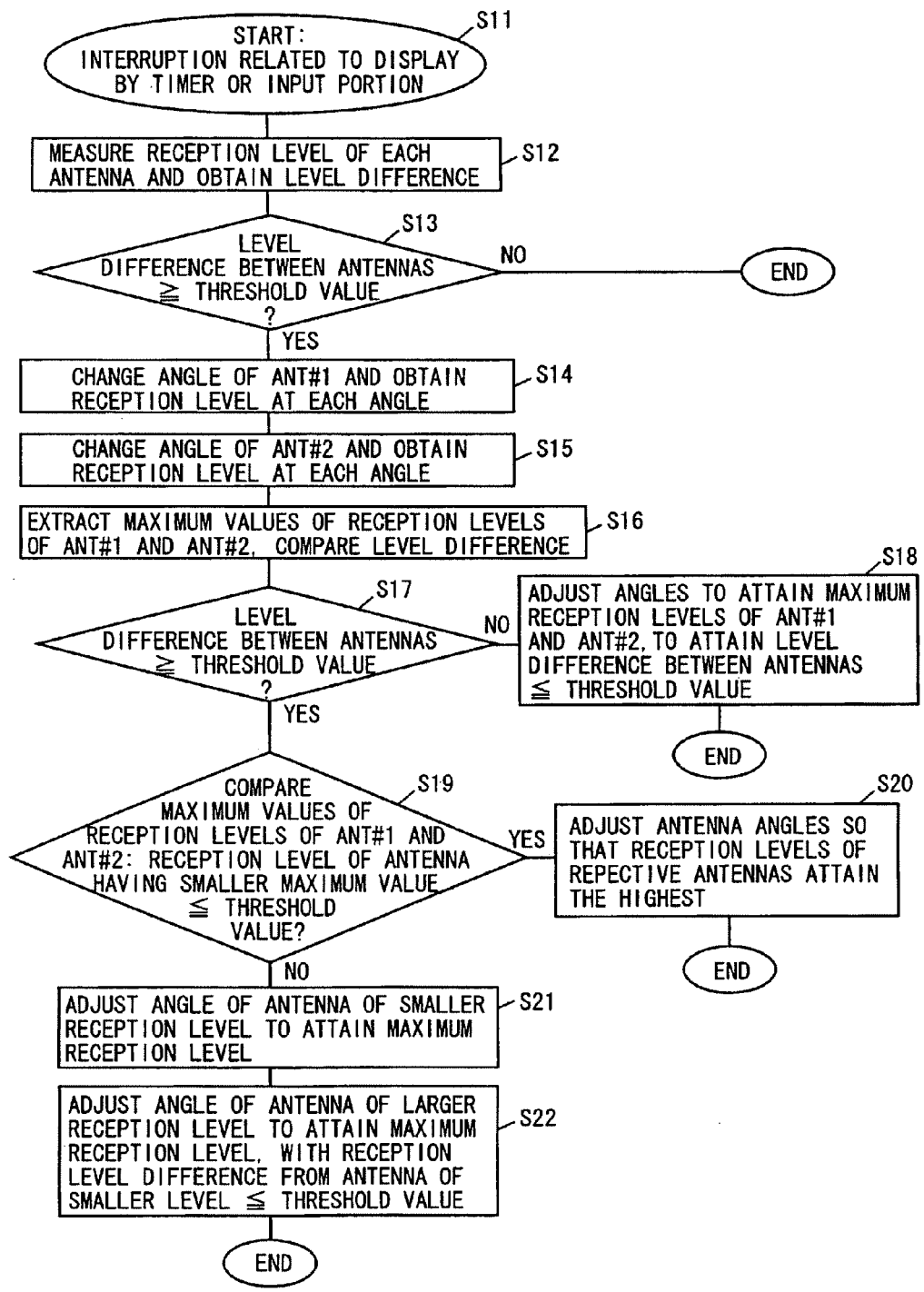

ADAPTIVE ARRAY WIRELESS COMMUNICATION APPARATUS, RECEPTION LEVEL DISPLAY METHOD, RECEPTION LEVEL ADJUSTING METHOD, RECEPTION LEVEL DISPLAY PROGRAM AND RECEPTION LEVEL ADJUSTING PROGRAM

This Application is a Divisional of U.S. patent application Ser. No. 10/528,097, filed Mar. 16, 2005, which is a National Phase Application of PCT/JP03/11179, filed Sep. 1, 2003, which claims priority from Japanese Patent Application No. 2002-274409, filed Sep. 20, 2002. The entire contents of the aforementioned applications are incorporated herein by reference.

TECHNICAL FIELD

The present invention relates to an adaptive array wireless communication apparatus, a reception level display method, a reception level adjusting method, a reception level display program and a reception level adjusting program. Particularly, the present invention relates to a mobile terminal apparatus having an adaptive array function using a plurality of antennas, and to a reception level display method, a reception level adjusting method, a reception level display program and a reception level adjusting program used in such a mobile terminal apparatus.

BACKGROUND ART

Conventionally, in a mobile communication system such as a PHS (Personal Handyphone System), wireless communication is established between a mobile terminal apparatus (hereinafter referred to as a terminal) and wireless base station (hereinafter referred to as a base station).

A conventional terminal typically has one antenna, and a radio frequency (RF) signal received by the antenna is subjected to various signal processing including amplification and frequency conversion in an RF receiving circuit.

One such signal processing performed in the RF receiving circuit is measurement of a reception power level (hereinafter referred to as a reception level) of the received signal. The reception level of the signal received by the antenna measured by the RF receiving circuit is displayed (notified) to the user on a display of the terminal, and hence, the user can estimate radio wave environment of the terminal.

A diversity terminal having two antennas and corresponding RF receiving circuits and selecting one of the antennas that has higher reception level as a reception antenna has been realized and disclosed, for example, in Japanese Patent Laying-Open No. 8-97759.

The diversity terminal has two antennas as mentioned above, and a received signal of one stream from either one of the antennas is selected, taken in the terminal and subjected to a signal processing for demodulation. Therefore, only the reception level of the received signal of one stream selected for demodulation is displayed for the user.

As for the base station, an adaptive array base station has been practically implemented, at which a signal from a specific user is received by a plurality of antennas, and the received signals of the plurality of streams are subjected to well-known adaptive array processing, so that the received signal from the user is separated and extracted.

Here, the adaptive array processing refers to a well-known process in which based on received signals from terminals, a weight vector consisting of reception coefficients (weights) of respective ones of the plurality of antennas of the base station is estimated and adaptively controlled, so that a signal from a specific terminal can be extracted (synthesized) accurately. As the adaptive array processing is well known, detailed description will not be given here.

As for the terminal, an adaptive array terminal having the function of adaptive array processing has also been developed. Such an adaptive array terminal has a plurality of (for example, two) antennas and corresponding plurality of (two) RF receiving circuits, and signals of a plurality of streams received by respective antennas are taken into the terminal and subjected to the adaptive array processing.

As a characteristic of the adaptive array processing, it has been known that better reception characteristic can be attained when reception level difference among the plurality of antennas is smaller. Actually, however, there is reception level difference generated among the plurality of antennas, because of difference in angle of the plurality of antennas as well as fading.

In view of the foregoing, it is desired that the reception level difference among the plurality of antennas is adjusted by some method, in order to improve reception performance of the adaptive array terminal.

A terminal having two antennas, as is the case of the diversity terminal described above, one of which is a fixed antenna provided inside the terminal and the other is a movable antenna mounted on the outside of the terminal of which angle can be adjusted by moving itself forward or backward, has been implemented as an example of the conventional terminals.

Conventionally, however, the reception level display for the user is only the reception level of the signal of one stream received and taken in the terminal as described above, regardless of the number of antennas of the terminal.

Therefore, though the conventional terminal having a plurality of (two) antennas employs a movable antenna allowing angle adjustment of the antenna, it has been impossible to know the reception level of each of the plurality of antennas.

Therefore, similarly in the adaptive array terminal having a plurality of antennas, it has been impossible for the user to know the reception level of each antenna, and therefore, even if there is a movable antenna, it has been impossible for the user to adjust the angle of the antenna to make smaller the reception level difference among the reception antennas.

Further, in the conventional terminal having a plurality of antennas employing a movable antenna, the reception level has been adjusted by the user manually adjusting the angle of the movable antenna while visually monitoring the reception level displayed on the terminal, which adjustment has been unsatisfactory in accuracy.

DISCLOSURE OF THE INVENTION

Therefore, an object of the present invention is to provide an adaptive array wireless communication apparatus, a reception level display method, a reception level adjusting method, a reception level display program and a reception level adjusting program, by which it becomes possible for the user to readily adjust the reception level of the antenna even in an adaptive array wireless communication apparatus having a plurality of antennas.

Another object of the present invention is to provide an adaptive array wireless communication apparatus, a reception level display method, a reception level adjusting method, a reception level display program and a reception level adjusting program, by which the reception level of the antenna can automatically be adjusted with high accuracy even in an adaptive array wireless communication apparatus having a plurality of antennas.

According to one aspect, the present invention provides an adaptive array wireless communication apparatus having a plurality of antennas, including determining means, display means and reception level adjusting means. The determining means determines reception levels of signals of a plurality of streams received by respective ones of the plurality of antennas. The display means displays the determined reception levels of the signals of the plurality of streams. The reception level adjusting means allows, by manual operation by the user, adjustment of the reception levels of signals of the plurality of streams.

Preferably, the display means displays a numerical value indicative of the reception level of each of the signals of the plurality of streams.

Preferably, the display means displays a difference value between each of the reception levels of the signals of the plurality of streams.

Preferably, the display means displays a degree of magnitude of the difference value between each of the reception levels of the signals of the plurality of streams.

Preferably, the display means is capable of selectively displaying, as contents of display, any of numerical value indicative of the reception level of each of the signals of the plurality of streams, the difference value between each of the reception levels and a degree of magnitude of the difference value, and the adaptive array wireless communication apparatus further includes display contents determining means for determining the contents to be displayed by the displaying means, in accordance with prior designation by the user.

Preferably, the display means is capable of selectively displaying, as contents of display, any of numerical value indicative of the reception level of each of the signals of the plurality of streams, the difference value between each of the reception levels and a degree of magnitude of the difference value, and the adaptive array wireless communication apparatus further includes display contents switching means for periodically and successively switching the contents to be displayed by the display means.

Preferably, the adaptive array wireless communication apparatus further includes activating means for automatically activating the determining means and the display means.

Preferably, the adaptive array wireless communication apparatus further includes activating means for activating, in response to a user instruction, the determining means and the reception level adjusting means.

According to another aspect, the present invention provides an adaptive array wireless communication apparatus having a plurality of antennas including determining means, reception level difference calculating means, and reception level adjusting means. The determining means determines reception levels of signals of a plurality of streams received by respective ones of the plurality of antennas. The reception level difference calculating means calculates a difference among the determined reception levels of the signals of the plurality of streams. The reception level adjusting means adjusts the reception levels of signals of the plurality of streams such that the calculated reception level difference decreases.

Preferably, the reception level adjusting means includes antenna driving means for changing an angle between each of the plurality of antennas, and control means for controlling the antenna driving means such that the angle between each of the plurality of antennas is changed such that the reception level difference is not higher than a prescribed threshold value.

Preferably, the adaptive array wireless communication apparatus further includes activating means for automatically activating the determining means and the reception level adjusting means.

Preferably, the adaptive array wireless communication apparatus further includes activating means for activating, in response to a user instruction, the determining means and the reception level adjusting means.

According to a further aspect, the present invention provides a method of displaying a reception level in an adaptive array wireless communication apparatus having a plurality of antennas, including the step of determining reception levels of signals of a plurality of streams received by respective ones of the plurality of antennas, and the step of displaying the determined reception levels of signals of the plurality of streams.

Preferably, in the display step, a numerical value indicative of the reception level of each of the signals of the plurality of streams is displayed.

Preferably, in the display step, a difference value between each of the reception levels of the signals of the plurality of streams is displayed.

Preferably, in the display step, a degree of magnitude of the difference value between each of the reception levels of the signals of the plurality of streams is displayed.

Preferably, in the display step, any of a numerical value indicative of the reception level of each of the signals of the plurality of streams, the difference value between each of the reception levels and a degree of magnitude of the difference value can selectively be displayed as the display contents, and the method of displaying the reception level further includes the step of determining the contents to be displayed in the display step in accordance with prior designation by the user.

Preferably, in the display step, any of a numerical value indicative of the reception level of each of the signals of the plurality of streams, the difference value between each of the reception levels and a degree of magnitude of the difference value can selectively be displayed as the display contents, and the method of displaying the reception level further includes the step of periodically and successively switching the contents to be displayed in the display step.

Preferably, the method of displaying the reception level further includes the step of automatically activating the determining step and the display step.

Preferably, the method of displaying the reception level further includes the step of activating, in response to a user instruction, the determining step and the display step.

According to a still further aspect, the present invention provides a method of adjusting a reception level in an adaptive array wireless communication apparatus having a plurality of antennas including the step of determining reception levels of signals of a plurality of streams received by respective ones of the plurality of antennas, the step of calculating a difference among the determined reception levels of the signals of the plurality of streams, and the step of adjusting the reception levels of signals of the plurality of streams such that the calculated reception level difference decreases.

Preferably, the reception level adjusting step includes the step of changing an angle between each of the plurality of antennas such that the reception level difference is not higher than a prescribed threshold value.

Preferably, the method of adjusting reception level further includes the step of automatically activating the determining step and the reception level adjusting step.

Preferably, the method of adjusting reception level further includes the step of activating, in response to a user instruction, the determining step and the reception level adjusting step.

According to a still further aspect, the present invention provides a reception level display program in an adaptive array wireless communication apparatus having a plurality of antennas, causing a computer to execute the step of determining reception levels of signals of a plurality of streams received by respective ones of the plurality of antennas, and the display step of displaying the determined reception levels of signals of the plurality of streams.

Preferably, in the display step, a numerical value indicative of the reception level of each of the signals of the plurality of streams is displayed.

Preferably, in the display step, a difference value between each of the reception levels of the signals of the plurality of streams is displayed.

Preferably, in the display step, a degree of magnitude of the difference value between each of the reception levels of the signals of the plurality of streams is displayed.

Preferably, in the display step, any of a numerical value indicative of the reception level of each of the signals of the plurality of streams, the difference value between each of the reception levels and a degree of magnitude of the difference value can selectively be displayed as the display contents, and the reception level display program causes the computer to further execute the step of determining the contents to be displayed in the display step, in accordance with prior designation by the user.

Preferably, in the display step, any of a numerical value indicative of the reception level of each of the signals of the plurality of streams, the difference value between each of the reception levels and the degree of magnitude of the difference value can selectively be displayed as the display contents, and the reception level display program causes the computer to further execute the step of periodically and successively switching the contents to be displayed in the display step.

Preferably, the reception level display program causes the computer to further execute the step of automatically activating the determining step and the display step.

Preferably, the program causes the computer to further execute the step of activating, in response to a user instruction, the determining step and the display step.

According to a further aspect, the present invention provides a reception level adjusting program in an adaptive array wireless communication apparatus having a plurality of antennas, causing a computer to execute the step of determining reception levels of signals of a plurality of streams received by respective ones of the plurality of antennas, the step of calculating a difference value between each of the determined reception levels of the signals of the plurality of streams, and the step of adjusting the reception levels of signals of the plurality of streams such that the calculated reception level difference becomes smaller.

Preferably, the reception level adjusting step includes the step of changing an angle between each of the plurality of antennas such that the reception level difference is not higher than a prescribed threshold value.

Preferably, the reception level adjusting program causes the computer to further execute the step of automatically activating the determining step and the reception level adjusting step.

Preferably, the reception level adjusting program causes the computer to further execute the step of activating, in response to a user instruction, the determining step and the reception level adjusting step.

Therefore, according to the present invention, in an adaptive array wireless communication apparatus having a plurality of antennas, the reception levels of signals of a plurality of streams received by respective ones of the plurality of antennas can be displayed to the user. Therefore, it becomes possible for the user to adjust reception level such that reception level difference among antennas decreases by adjusting, for example, an angle of a movable antenna while visually monitoring the display. Thus, the reception performance of adaptive array processing in the adaptive array wireless communication apparatus can further be improved.

Further, according to the present invention, in an adaptive array wireless communication apparatus having a plurality of antennas, reception level difference of signals of the plurality of streams received by respective ones of the plurality of antennas is calculated, and by automatically adjusting an angle of a movable antenna, for example, to reduce the difference, the reception level can be adjusted with higher accuracy. Therefore, the reception performance of adaptive array processing in the adaptive array wireless communication apparatus can further be improved.

BRIEF DESCRIPTION OF THE DRAWINGS

FIG. 5 is a flow chart representing an operation of the adaptive array terminal in accordance with the second embodiment of the present invention.

BEST MODES FOR CARRYING OUT THE INVENTION

Figure 1:
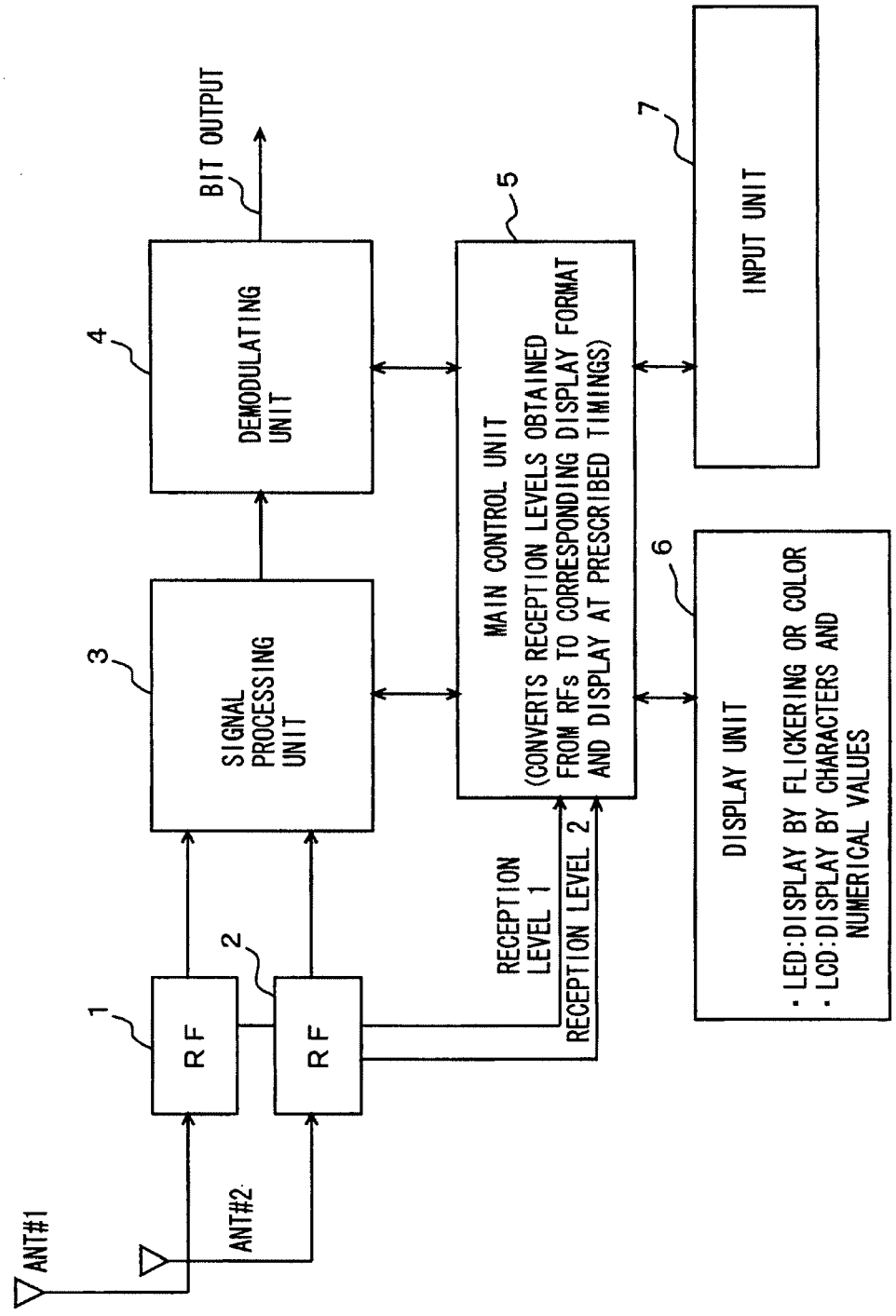
FIG. 1 is a functional block diagram representing a configuration of an adaptive array terminal in accordance with a first embodiment of the present invention.

In the following, embodiments of the present invention will be described in detail with reference to the figures. In the figures, the same or corresponding portions will be denoted by the same reference characters and description thereof will not be repeated.

First Embodiment

FIG. 1 is a functional block diagram representing a configuration of an adaptive array terminal in accordance with a first embodiment of the present invention.

A wireless downlink signal from a base station, not shown, is received by antennas ANT#1 and ANT#2, respectively, and applied as RF signals of radio frequency to corresponding RF receiving circuits 1 and 2.

In each of RF receiving circuits 1 and 2, the received RF signal is subjected to prescribed analog processing such as amplification and frequency conversion, and the resulting signal is applied to a signal processing unit 3. Under the control of a main control unit 5, signal processing unit 3 performs the adaptive array processing on the signals received from RF receiving circuits 1 and 2, whereby desired reception signals are separated and extracted.

Specifically, in signal processing unit 3, a well-known adaptive array processing is performed, in which based on the reception signals from the base station, a weight vector consisting of weights of two antennas ANT#1 and ANT#2 of the terminal is estimated and adaptively controlled, so that the desired signal from the base station is extracted (synthesized) accurately.

The signal processing unit 3 shown in FIG. 1 includes a weight control unit, not shown, for estimating the weight vector for each symbol of the received signal, and the weight control unit executes a process of converging the weight vector such that a square of a difference between a complex multiplication sum of the received signal vector and the estimated weight vector and a known reference signal decreases, that is, the adaptive array processing of converging the reception directivity from the base station.

In the adaptive array processing, such a convergence of weight vector is performed adaptively in accordance with time and variation of propagation path characteristics of signal waves, so that interference components and noise can be removed from the received signal and the signal from the base station can be extracted.

In the weight control unit as such, sequential estimation algorithm such as RLS (Recursive Least Squares) algorithm or LMS (Least Mean Square) algorithm is used.

RLS algorithm and LMS algorithm are well known in the field of adaptive array processing and described in detail, for example, in *Adaptive Signal Processing by Array Antenna* by Nobuyoshi Kikuma (Kagaku Gijutsu Shuppan), published on Nov. 25, 1998, *"Chapter 3: MMSE Adaptive Array"* on pp. 35-49 and, therefore, detailed description of adaptive array processing will not be given here.

Further, a demodulating unit 4 shown in FIG. 1 performs, under the control by main control unit 5, a demodulating process on the received signal separated and extracted by the adaptive array processing at signal processing unit 3, and outputs demodulated bit outputs.

Main control unit 5 controls operations of not only the signal processing unit 3 and demodulating unit 4 described above but also of a display unit 6, which will be described later, in accordance with an instruction by the user through an input unit 7.

In RF receiving circuits 1 and 2, reception levels of the received signals are measured, and reception level 1 from RF receiving circuit 1 and reception level 2 from RF receiving circuit 2, respectively, are applied to main control unit 5.

Main control unit 5 converts reception levels 1 and 2 received from RF receiving circuits 1 and 2 to various display formats, as will be described later, and displays on display unit 6 at a prescribed timing.

Display unit 6 may be implemented by display devices of various types, such as light emitting diode (LED) and liquid crystal display (LCD). When implemented by an LED, for example, the reception level may be indicated by flickering or the color of light emission. When implemented by an LCD, the reception level may be indicated by characters or numerical values appearing on the display screen.

Figure 2:
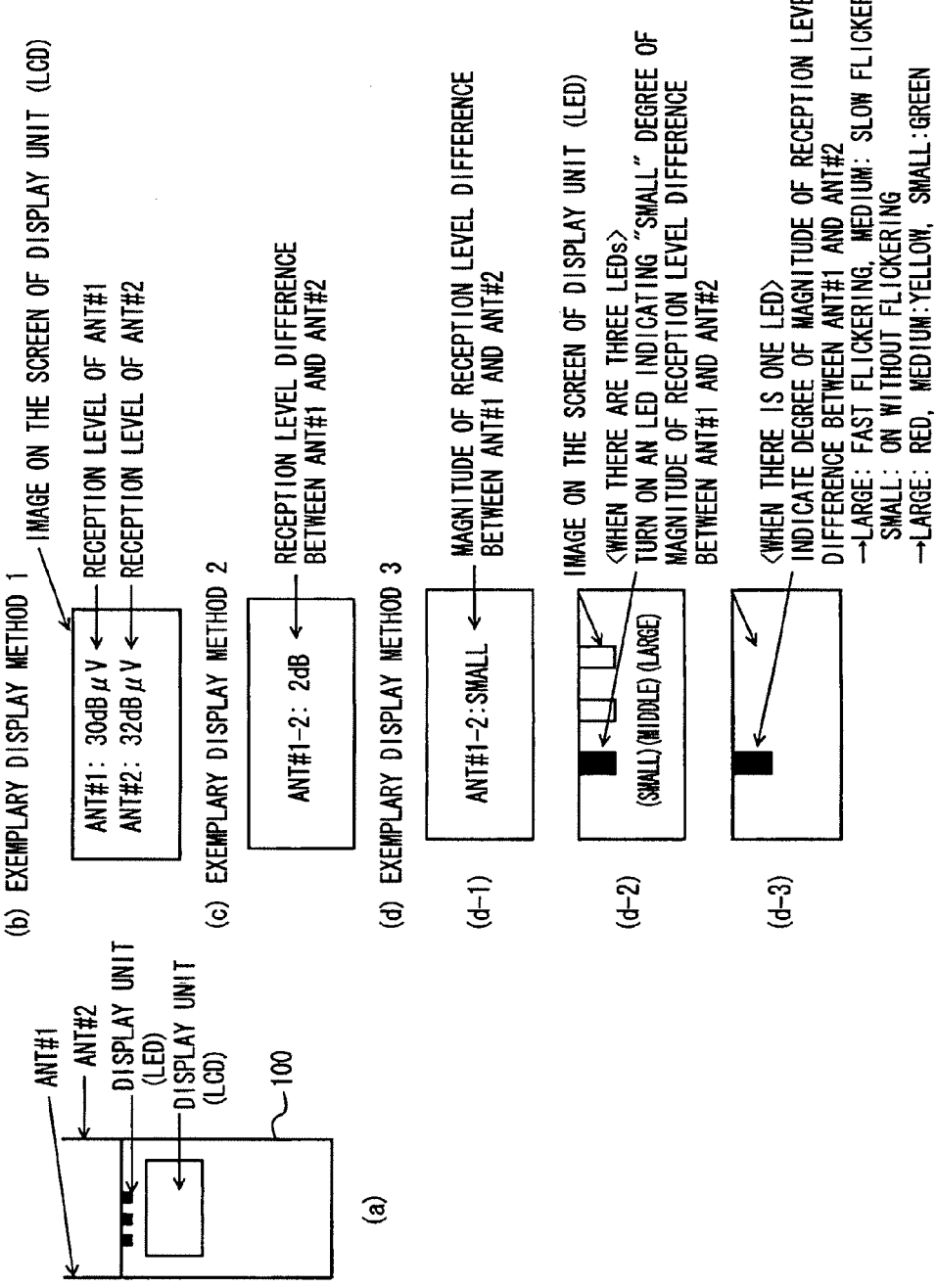
FIG. 2 is a schematic diagram representing an exemplary method of displaying the reception level of the adaptive array terminal in accordance with a first embodiment of the present invention.

FIG. 2 is a schematic diagram representing an exemplary method of displaying the reception level of the adaptive array terminal in accordance with a first embodiment of the present invention.

In FIG. 2, (*a*) schematically shows a frontal view of an adaptive array terminal 100. Referring to FIG. 2 (*a*), adaptive array terminal 100 has two antennas ANT#1 and ANT#2, at least one of which is a movable antenna that can be moved forward and backward, allowing adjustment of an angle with the other antenna.

It is assumed that adaptive array terminal 100 has the display unit corresponding to display unit 6 of FIG. 1 implemented by an LED and/or LCD. In the following, the manner of displaying the reception level using these display units will be described.

FIG. 2 (*b*) shows an exemplary Display Method 1 in accordance with the first embodiment of the present invention. In Display Method 1, reception levels of two antennas ANT#1 and ANT#2 are displayed directly as numerical values based on reception levels 1 and 2 from RF receiving circuits 1 and 2, on the display unit formed of LCD on adaptive array terminal 100, by an instruction from main control unit 5.

For instance, in the example of FIG. 2 (*b*), as the image on the display unit formed of LCD, 30 dBμV as the reception level of antenna ANT#1 and 32 dBμV as the reception level of antenna ANT#2 are displayed.

Visually monitoring the display, the user manually adjusts the angle of movable antenna so that the two antennas come to have the same reception levels.

Next, FIG. 2 (*c*) shows an exemplary Display Method 2 in accordance with the first embodiment of the present invention. In Display Method 2, reception level difference between reception levels of two antennas ANT#1 and ANT#2 is calculated by main control unit 5 based on reception levels 1 and 2 from RF receiving circuits 1 and 2, and is displayed as a difference value, on the display unit formed of an LCD on adaptive array terminal 100.

For instance, in the example of FIG. 2 (*c*), as the image on the display unit formed of LCD, 2 dBμV is displayed as the difference value between the reception level of antenna ANT#1 and the reception level of antenna ANT#2.

Visually monitoring the display, the user manually adjusts the angle of movable antenna so that the reception level difference between the two antennas becomes zero level.

Next, FIG. 2 (*d*) shows an exemplary Display Method 3 in accordance with the first embodiment of the present invention. In Display Method 3, reception level difference between reception levels of two antennas ANT#1 and ANT#2 is calculated by main control unit 5 based on reception levels 1 and 2 from RF receiving circuits 1 and 2, and is displayed as a degree of magnitude of difference value, on the display unit formed of an LCD.

By way of example, such a degree of magnitude of difference value may be determined by main control unit 5, in which the magnitude of difference value is compared with a prescribed threshold value or values to be classified into three, that is, large, medium and small.

In the example of FIG. 2 (*d*-1), as an image on the display unit formed of LCD, "small" is displayed as the degree of magnitude of difference value between the reception level of antenna ANT#1 and reception level of antenna ANT#2.

In the example of FIG. 2 (*d*-2), as an image on the display unit formed of three LEDs, one LED corresponding to "small" as the degree of magnitude of difference value between the reception level of antenna ANT#1 and reception level of antenna ANT#2 is turned on.

In the example of FIG. 2 (*d*-3), as an image on the display unit formed of one LED, the LED is turned on with flicker rate or with a color corresponding to "small" as the degree of magnitude of difference value between the reception level of antenna ANT#1 and reception level of antenna ANT#2.

For instance, if the degree of magnitude of difference value is "large", the LED may be flickered at a high rate, if it is "middle", the LED may be flickered at a middle rate, and if it is "small", the LED may be kept on without flickering.

Alternatively, if the degree of magnitude of difference value is "large", red light may be emitted from the LED, if it is "middle", yellow light may be emitted from the LED, and if it is "small", green light may be emitted.

Visually monitoring the display, the user manually adjusts the angle of movable antenna so that the reception level difference between the two antennas becomes smaller.

As for the selection of Display Methods 1 to 3 described above, the user may designate the method by an operation through input unit 7 beforehand, or Display Methods 1 to 3 may be periodically and successively switched.

Further, the processes of determining and displaying reception level described above may be automatically activated by the adaptive array terminal, or may be activated triggered by the user operation through input unit 7.

Figure 3:
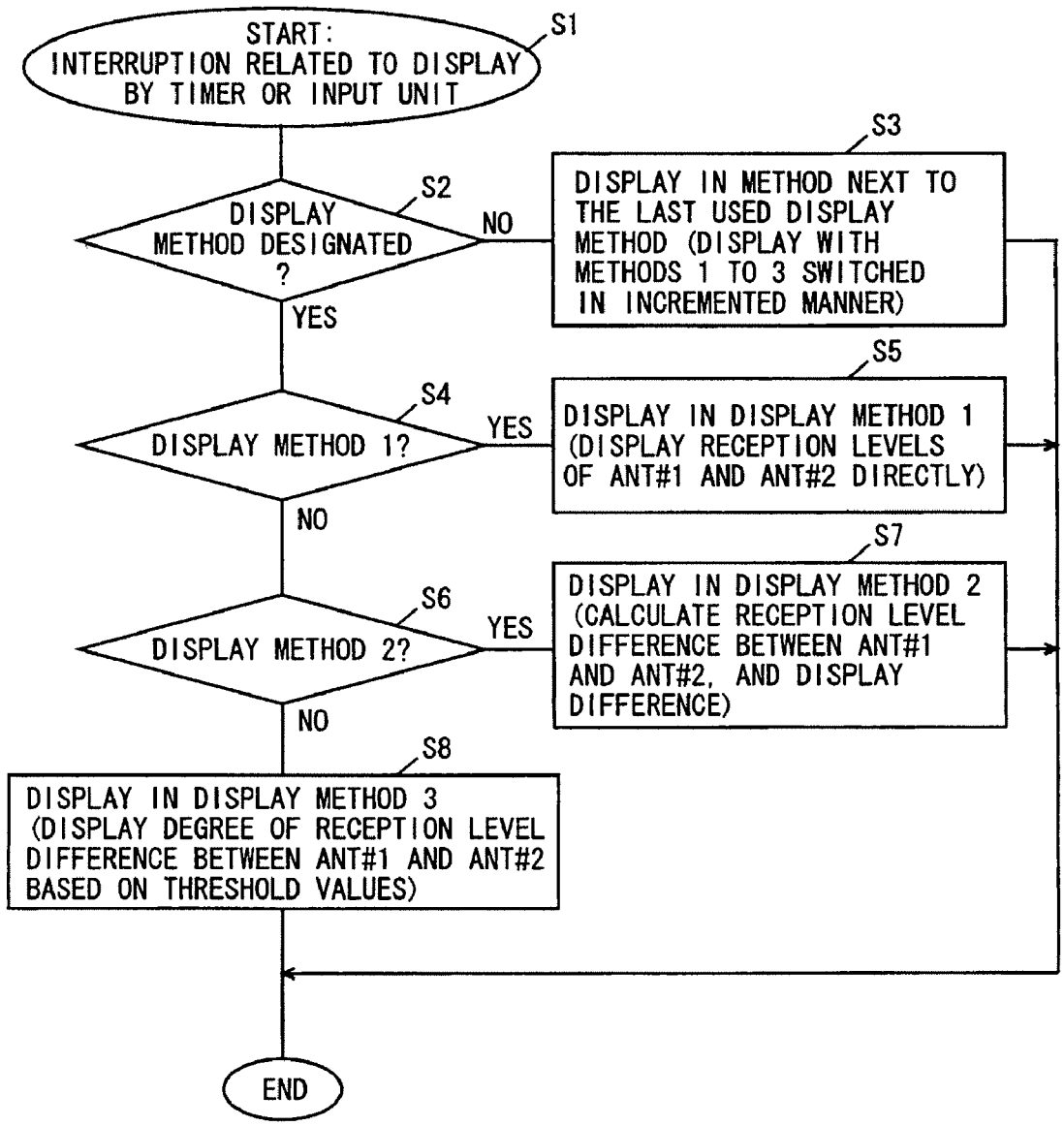
FIG. 3 is a flow chart representing an operation of the adaptive array terminal in accordance with the first embodiment of the present invention.

The configuration of the functional block of the adaptive array terminal shown in FIG. 1 is actually realized by software executed by a digital signal processor (DSP), not shown, along the flow chart of FIG. 3. DSP reads a program including various steps of the flow chart of FIG. 3 from a memory, not shown, and executes the program. The program may be installed from the outside.

In the following, an operation of the adaptive array terminal in accordance with the first embodiment of the present invention will be described.

First, in step S1, an operation related to the display is automatically activated by a timer interruption, or an operation related to the display is automatically activated by an operation of the input unit by the user.

In step S2, whether the display method (for example, any of Display Methods 1 to 3 described with reference to FIG. 2) has been designated in advance by the user or not is determined.

When the method is not specifically designated, in step S3, a display method next to the one used last time is used as the display method (specifically, in step S3, Display Methods 1 to 3 are displayed incremented successively).

In step S2, if it is determined that the display method has been designated beforehand, the flow proceeds to step S4, and whether the designated display method is Display Method 1 of FIG. 2 (*b*) or not is determined.

If it is determined in step S4 that the designated method is Display Method 1, the flow proceeds to steps S5 in which reception level values of antennas ANT#1 and ANT#2 are displayed directly, in accordance with Display Method 1 as shown in FIG. 2 (*b*).

If it is determined in step S4 that the designated method is not Display Method 1, the flow proceeds to step S6 in which whether the designated display method is Display Method 2 of FIG. 2 (*c*) or not is determined.

If it is determined in step S6 that the designated method is Display Method 2, the flow proceeds to steps S7 in which a difference value between reception levels of antennas ANT#1 and ANT#2 is displayed, in accordance with Display Method 2 as shown in FIG. 2 (*c*).

If it is determined in step S6 that the designated method is not Display Method 2, the flow proceeds to step S8, in which the degree of magnitude of difference value between reception levels of antennas ANT#1 and ANT#2 is displayed, in accordance with Display Method 3 as shown in FIG. 2 (*d*).

By the repetition of the above described processes, when the display method has been designated by the user, the display is given in the designated display method, and otherwise, Display Methods 1 to 3 are successively repeated.

As described above, according to the first embodiment of the present invention, in an adaptive array terminal having a plurality of antennas, reception levels of the signals of a plurality of streams received by respective ones of the plurality of antennas can be displayed (notified) to the user in various manners. Therefore, it becomes possible for the user to adjust the reception level such that reception level difference among antennas decreases by adjusting, for example, an angle of a movable antenna, that is, an angle of an antenna with another antenna, while visually monitoring the display. Thus, the reception performance of adaptive array processing in the adaptive array wireless communication apparatus can further be improved.

Second Embodiment

Figure 4:
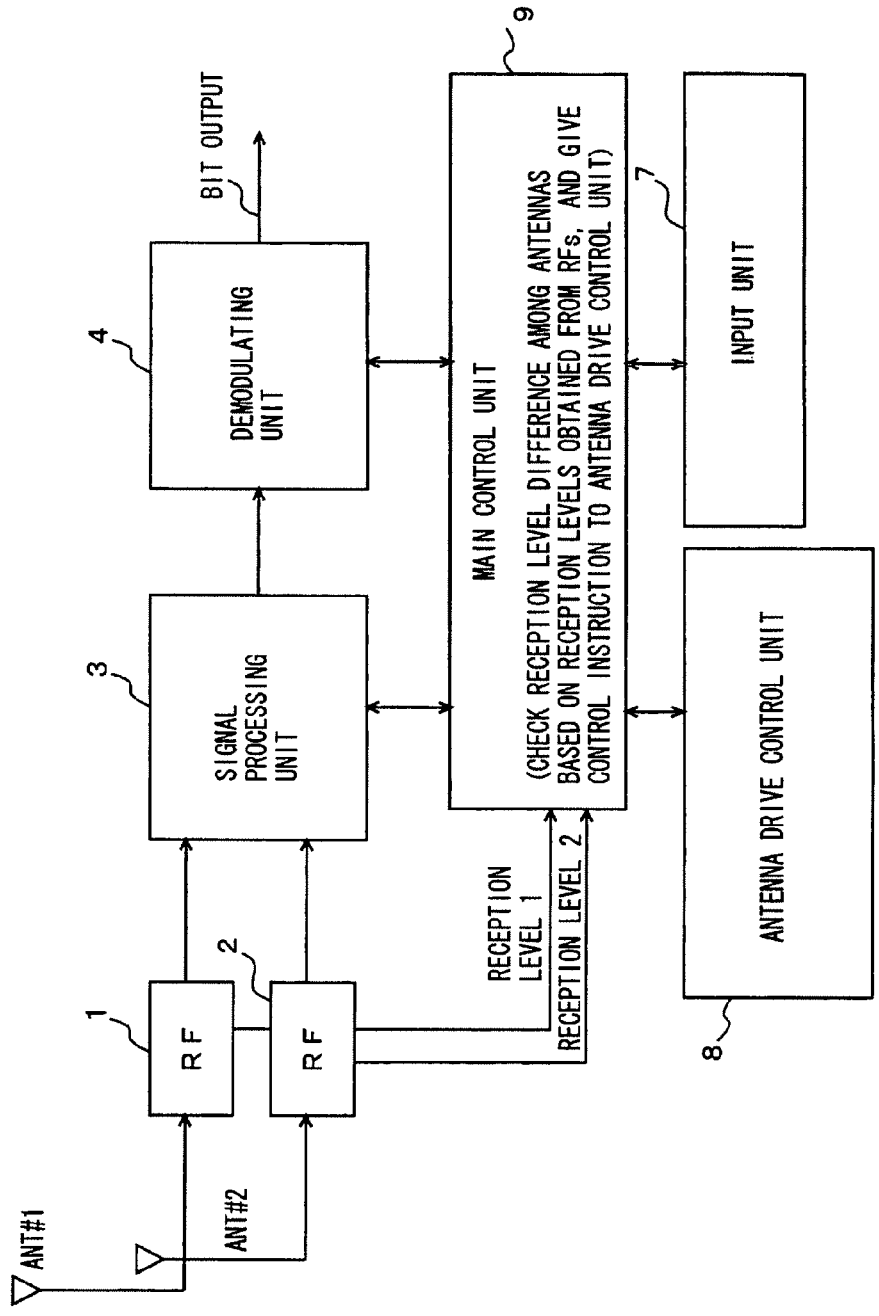
FIG. 4 is a functional block diagram representing a configuration of an adaptive array terminal in accordance with a second embodiment of the present invention.

FIG. 4 is a functional block diagram representing a configuration of an adaptive array terminal in accordance with the second embodiment of the present invention. The functional block diagram of FIG. 4 is the same as the functional block diagram of the first embodiment of FIG. 1 except for the following points, and description of common portions will not be repeated.

Specifically, in the functional block diagram of FIG. 4, in place of (or in addition to) display unit 6 shown in FIG. 1, an antenna drive control unit 8 is provided. Further, in place of main control unit 5 controlling display unit 6 of FIG. 1, a main control unit 9 controlling antenna drive control unit 8 is provided.

Antenna drive control unit 8 automatically drives and controls the angle adjustment of the movable antenna, of which angle can be changed by moving forward or backward, of the two antennas of the adaptive array terminals, in accordance with a control signal from main control unit 9.

Main control unit 9 calculates the reception level difference between reception levels 1 and 2 received from RF receiving circuits 1 and 2, and if it is determined that the level difference is not smaller than a prescribed threshold value, controls antenna drive control unit 8 such that the angle of the two antennas with each other is adjusted to make the level difference not larger than the threshold value.

The processes of determining the reception level and antenna drive control described above may be automatically activated by the adaptive array terminal, or may be activated triggered by the user operation through input unit 7.

The configuration of the functional block of the adaptive array terminal shown in FIG. 4 is actually realized by software executed by a digital signal processor (DSP), not shown, along the flow chart of FIG. 5. DSP reads a program including various steps of the flow chart of FIG. 5 from a memory, not shown, and executes the program. The program may be installed from the outside.

In the following, an operation of the adaptive array terminal in accordance with the second embodiment of the present invention will be described with reference to FIG. 5. In the following description, it is assumed that two antennas provided on the adaptive array terminal are both movable antennas of which angles can be changed.

First, in step S11, an operation related to the antenna control is automatically activated by a timer interruption, or an operation related to the antenna control is automatically activated by an operation of the input portion by the user.

Thereafter, in step S12, the reception level difference is calculated from reception levels 1 and 2 corresponding to antennas ANT#1 and ANT#2.

Next, in step S13, whether the calculated reception level difference is not lower than a prescribed threshold value or not is determined. If it is determined that the reception level difference is equal to or lower than the threshold value, the process is terminated.

If it is determined that the reception level difference is not lower than the prescribed threshold value, the angle of antenna ANT#1 is changed and reception level 1 corresponding to each angle is obtained and stored in step S14.

Next, in step S15, the angle of antenna ANT#2 is changed and reception level 2 corresponding to each angle is obtained and stored.

Then, in step S16, the maximum value among the obtained reception levels 1 and the maximum value among the obtained reception levels 2 are extracted, and the level difference therebetween is compared with a prescribed threshold value.

In step S17, if it is determined that the level difference is equal to or smaller than the threshold value, the flow proceeds to step S18, in which angles of antennas ANT#1 and ANT#2 are adjusted such that maximum values of reception levels 1 and 2 are attained.

In step S17, if it is determined that the level difference is not lower than the threshold value, maximum values of reception levels 1 and 2 of antennas ANT#1 and ANT#2 are compared with each other, and whether the reception level of the antenna having the smaller maximum value is the same as or lower than a prescribed threshold value or not is determined.

If it is determined that the value is the same or lower than the threshold value, the flow proceeds to step S20, in which angels of antennas ANT#1 and ANT#2 are adjusted so that reception levels 1 and 2 both attain the maximum values. Then, the process is terminated.

The reason for this is as follows. If the reception level of the antenna having smaller maximum value is equal to or smaller than the threshold value and is too small, it is better to attain higher reception level at each antenna even if there is considerable reception level difference, rather than to adjust the reception level using the antenna of such low reception level as the reference.

In step S19, if the reception level of the antenna having smaller maximum value is not lower than the threshold value, that is, if it is not too small, the angle of the antenna is adjusted such that the reception level of that antenna attains the maximum value, in step S21.

Next, in step S22, the angle of the antenna having larger maximum value is adjusted such that the reception level difference from the antenna having smaller maximum value is not higher than the threshold value and the reception level attains the highest under this condition.

Thus, the highest possible reception level can be attained while the reception level difference between the two antennas is kept within the tolerable range.

As described above, in the second embodiment of the present invention, in an adaptive array terminal having a plurality of antennas, reception level difference of signals of the plurality of streams received by respective ones of the plurality of antennas is calculated, and by automatically adjusting an angle of a movable antenna, for example, to reduce the difference, the reception level can be adjusted with higher accuracy. Therefore, the reception performance of adaptive array processing in the adaptive array wireless communication apparatus can further be improved.

In the first and second embodiments described above, the number of antennas of the adaptive array terminal is two. The number is not limited to two, and it may be any number necessary for adaptive array processing. Further, it is not necessary that the plurality of antennas are all movable. Movable and unmovable antennas may exist in a mixed manner, provided that the angle between each of the antennas can be adjusted.

As described above, according to the present invention, in an adaptive array wireless communication apparatus having a plurality of antennas, it is possible to indicate the reception levels of signals received by respective ones of the plurality of antennas. Therefore, it becomes possible for the user to adjust reception level such that reception level difference among antennas decreases by adjusting, for example, an angle of a movable antenna while visually monitoring the display. Thus, the reception performance of adaptive array processing in the adaptive array wireless communication apparatus can further be improved.

Further, according to the present invention, in an adaptive array wireless communication apparatus having a plurality of antennas, reception level difference of signals of the plurality of systems received by respective ones of the plurality of antennas is calculated, and by automatically adjusting an angle of a movable antenna, for example, to reduce the difference, the reception level can be adjusted with higher accuracy. Therefore, the reception performance of adaptive array processing in the adaptive array wireless communication apparatus can further be improved.

INDUSTRIAL APPLICABILITY

According to the present invention, reception levels of a plurality of antennas are displayed to the user to make it possible for the user to adjust reception level, or, automatic adjustment of the reception level is made possible to reduce the reception level difference. Therefore, the invention is effective in an adaptive array wireless communication apparatus having a plurality of antennas.

The invention claimed is:

1. An adaptive array wireless communication apparatus having a plurality of antennas, comprising:
    determining unit that determines, before performing adaptive array processing, reception levels of signals of a plurality of streams received by respective ones of said plurality of antennas;
    reception level difference calculating unit that calculates a difference among said determined reception levels of signals of said plurality of streams; and
    reception level adjusting unit that adjusts the reception levels of signals of said plurality of streams such that said calculated reception level difference decreases.

2. A method of adjusting a reception level in an adaptive array wireless communication apparatus having a plurality of antennas, comprising the steps of:
    determining, before performing adaptive array processing, reception levels of signals of a plurality of streams received by respective ones of said plurality of antennas;
    calculating a difference among said determined reception levels of signals of said plurality of streams; and
    adjusting the reception levels of signals of said plurality of streams such that said calculated reception level difference decreases.

3. A reception level adjusting program in an adaptive array wireless communication apparatus having a plurality of antennas, comprising:
    one or more computer-readable media having computer-readable program code embodied therein or among them if more than one computer-readable medium, to be executed by a computer, the computer-readable program code for performing the steps:
    determining, before performing adaptive array processing, reception levels of signals of a plurality of streams received by respective ones of said plurality of antennas,
    calculating a difference value between each of said determined reception levels of the signals of said plurality of streams, and adjusting the reception levels of signals of said plurality of streams such that said calculated reception level difference becomes smaller.

4. The reception level adjusting program according to claim 3, wherein said reception level adjusting step includes the step of changing an angle between each of said plurality of antennas such that the reception level difference is not higher than a prescribed threshold value.

5. The reception level adjusting program according to claim 3, causing the computer to further execute the step of automatically activating said determining step and said display step.

6. The reception level adjusting program according to claim 3, causing the computer to further execute the step of activating said determining step and said display step in response to a user instruction.

* * * * *